United States Patent [19]

Wodajo

[11] Patent Number: 5,538,467
[45] Date of Patent: Jul. 23, 1996

[54] METHOD AND APPARATUS FOR EVISCERATING BEHEADED FISH

[76] Inventor: Samson Wodajo, 17724 11th Ave. NE., Seattle, Wash. 98155

[21] Appl. No.: 372,519

[22] Filed: Jan. 13, 1995

[51] Int. Cl.$^6$ .................................................. A22C 25/14
[52] U.S. Cl. ........................ 452/119; 452/121; 15/164; 15/88
[58] Field of Search ................................. 452/119, 121, 452/122; 15/164, 57, 58, 59, 88, 88.3

[56] References Cited

U.S. PATENT DOCUMENTS

| | | | |
|---|---|---|---|
| 1,224,923 | 5/1917 | Haubner | 452/119 |
| 2,204,124 | 6/1940 | Danielsson | 452/119 |
| 2,727,267 | 12/1955 | Osgood | 15/164 |
| 3,748,677 | 7/1973 | Frank et al. | 15/88.3 |
| 3,913,163 | 10/1975 | Durham | 15/164 |
| 4,535,509 | 8/1985 | Bullock et al. | 452/119 |
| 5,307,534 | 5/1994 | Miller | 15/88 |
| 5,339,480 | 8/1994 | Murg et al. | 15/164 |

*Primary Examiner*—Willis Little
*Attorney, Agent, or Firm*—Paul L. Griffiths

[57] ABSTRACT

A method and apparatus for eviscerating a beheaded fish without belly slitting the fish. A brush having a generally cylindrical shape is used to remove the entrails of a beheaded fish. In preferred form, the brush has multiple rows of bristle extending radially outwardly from a central shaft with the rows also being wrapped spirally around the shaft. The preferred brush is also cone shaped having a smaller diameter at the end of the brush first placed into the fish. The brush is driven by a hydraulic motor with a safety hood provided. A guide trough is used to help guide the fish onto the brush. A water nozzle helps rinse the brush between uses.

11 Claims, 2 Drawing Sheets

METHOD AND APPARATUS FOR EVISCERATING BEHEADED FISH

TECHNICAL FIELD

The present invention relates to fish processing, and in particular, to a device for eviscerating beheaded fish without cutting open the body cavity of the fish being processed.

BACKGROUND ART

The processing of fish in preparation for sale to consumers has traditionally been very labor intensive. Many different types of machines have been built in an attempt to reduce the labor required for processing fish. Machines presently available all require that fish be belly slit for removal of their viscera. In many markets today, especially in Asia, consumers desire to buy a headless fish with viscera removed but with the skin and bones intact, along with the fish meat. One reason is that a fish that has not been belly slit is easier to stuff. Until now, eviscerating has been accomplished after the fish's belly has been cut open or by hand using a spoon-like knife. The present invention reduces processing labor by eliminating the need to belly slit a fish in order to remove the viscera.

While the present invention may be useful on almost any species or type of fish, it is contemplated to be used for processing rock fish, other bottom fish, and cod or the like. The present invention eliminates the need to cut open the fish as they are being processed, saving time, labor and money. On fish processing trawlers, people work long hours, usually around sixteen hours per day. Removing viscera using a knife is a very tedious and repetitive task. Many workers suffer from fatigue and tendinitis, as well as carpal tunnel syndrome. Production rates slow to the point where the trawler cannot bring new fish aboard until the previous catch has been processed. The present invention eliminates the health problems mentioned above and decreases the time required to process fish. Another advantage of the present invention is that it more completely removes the viscera than can be accomplished by a worker. Quality of the processed fish is very important in Asian markets.

SUMMARY OF THE INVENTION

The present invention includes a generally cylindrically shaped brush that is rotated by conventional means for use in inviscerating beheaded fish. Compressed air or hydraulic power is generally available in either shore based or floating fish processing areas, either of which can be used to rotate the brush. It is contemplated that a variable speed drive be used to adjust the rotational speed of the brush according to the type of fish being processed.

It is another aspect of the invention that a water nozzle spray water over the brush for washing away any visceral that does not spin off of the brush.

The brush may also be conical in shape, that is, a free end of the brush, which enters the fish cavity first, has a smaller diameter bristle than that of the bristles at a driven end of the brush. The brush should have a plurality of rows of bristles that are staggered ninety degrees of rotation around the brush's shaft from the free end to the driven end of the brush. This aids in pulling the viscera out of the cavity. An anal bristle extending axially out of the brush's shaft helps to cut off the intestines from the anus of the fish.

Other features, objects and advantages of the invention are hereinafter described in the description of the best mode or preferred embodiment of the invention.

BRIEF DESCRIPTION OF THE DRAWINGS

In the drawings, like reference characters designate like parts throughout the several views, and.

BEST MODE FOR CARRYING OUT THE INVENTION

Figure 1:
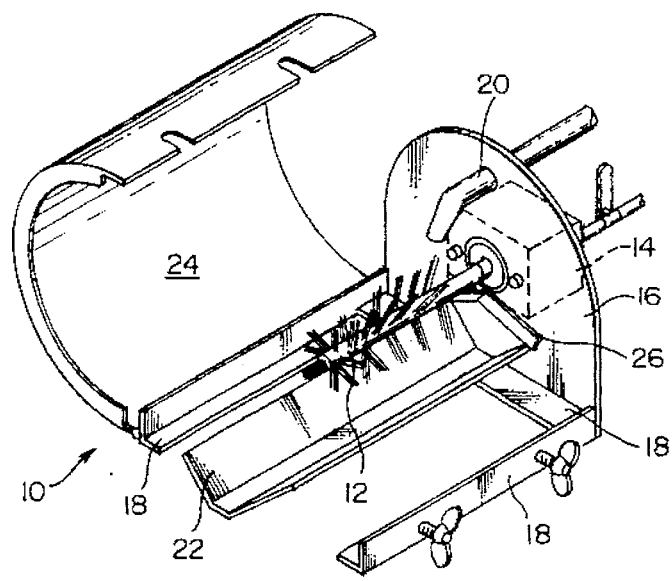
FIG. 1 is an isometric view of the present invention taken from slightly above and to the right side showing an eviscerating brush, a water nozzle, a fish guide, and a safety hood.

Referring now to FIG. 1, a beheaded fish eviscerating device is shown generally at 10. An entrails removal brush 12 is coupled to a motor 14. Motor 14 is mounted to a base plate 16 that includes a mounting frame 18. A water nozzle 20 is mounted to plate 16 above brush 12. A guide trough 22 extends perpendicularly outwardly from plate 16 and spaced below brush 12. A safety hood 24 is hingedly fastened to frame 18. An oil collection channel 26 is also shown. A more detailed description of the various components follows.

Figure 2:
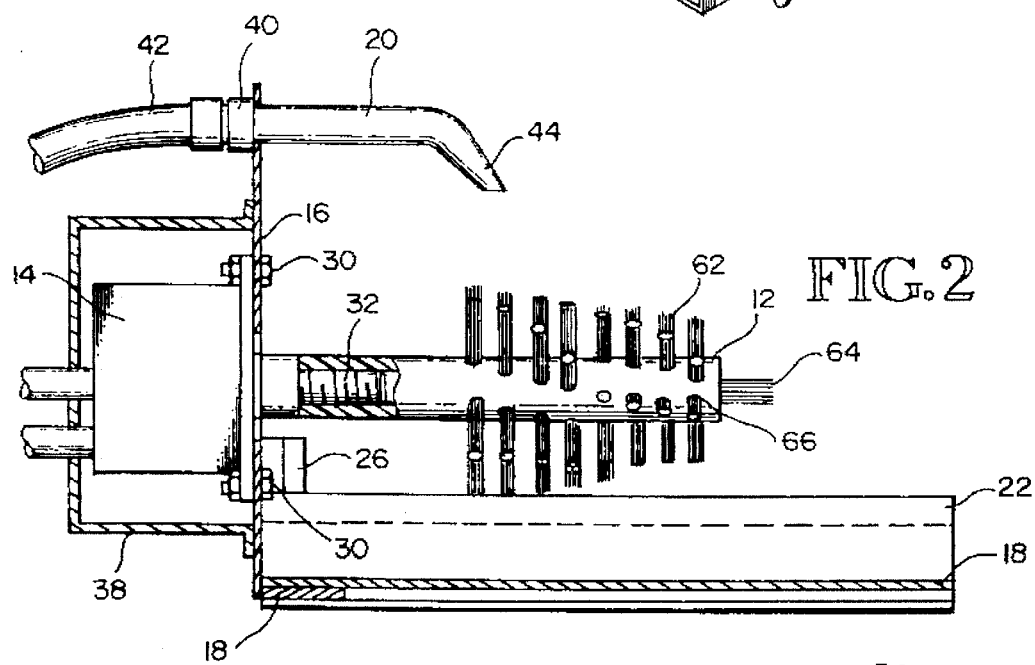
FIG. 2 is a side view, partially in cross section, showing the relative locations of the brush, a drive motor, and the water nozzle.

As shown in FIG. 2, a hydraulic motor 28 or the like, such as a pneumatic or electric motor, is mounted by conventional means to base plate 16. Conventional mounting means may include bolting as shown at 30. A rotational speed adjustable between fifty and one-thousand revolutions per minute is adequate. A motor shaft 32 extends through mounting plate 18 for connection to brush 12. Should the motor 14 not have a threaded output shaft a coupling (not shown) may be used to attach brush 12 thereto. Motor 28 includes inlet 34 and outlet 36 lines for supply and return of hydraulic fluid. A stainless steel cover 38 is also supplied to help protect motor 28 from the caustic environment.

A water nozzle 20 is welded to plate 16 and a hose coupling 40 is provided on the backside thereof for attachment to a water supply line 42. Water nozzle 20 includes an outlet 44 that is preferralby tapered to increase the velocity of the outflowing water. Nozzle outlet 44 is directed toward brush 12 in order to aid in removal of fish entrails that lodge thereon. Most of the entrails are dislodged by centrifugal force of rotation. Mounting flange 18 is used to mount the eviscerating device to any convenient location along a conveyor carrying beheaded fish.

Figure 3:
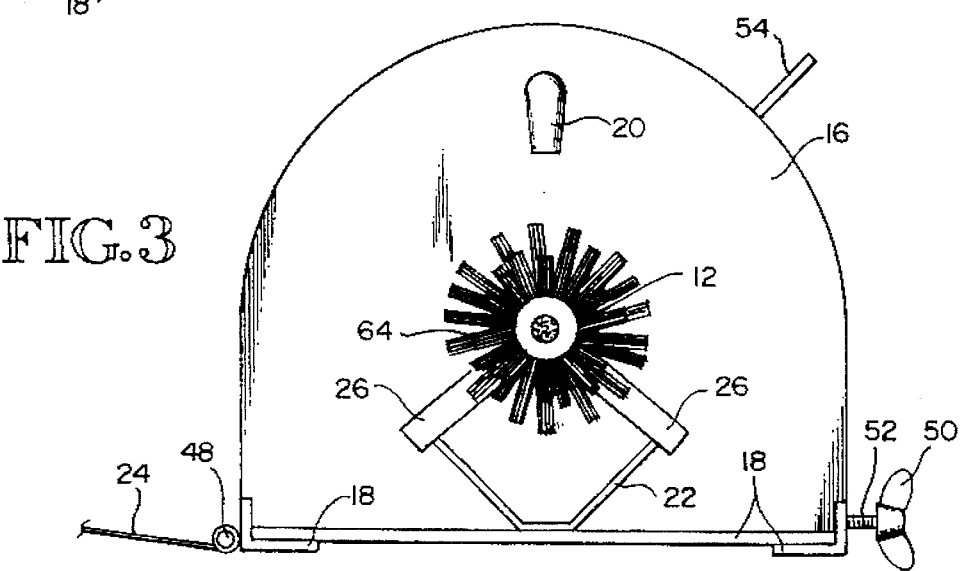
FIG. 3 is a front view of FIG. 2.

Referring now to FIG. 3, the relationship between brush 12 and guide trough 22 is shown. Oil channel 26 is also shown and is provided in case a shaft seal on motor 28 leaks, providing a pathway away from brush 12 for any leaking oil to be harmlessly disposed. Safety hood 24 is attached to frame 18 by a piano hinge 48 or the like. On the opposite side, hood 24 is held in position by a pair of wing nuts 50 acting in concert with a pair of studs 52 welded to frame 18. A handle 54 may be provided to aid in opening and closing hood 24. The entire assembly is fabricated from stainless steel or other non-corrosive materials.

Figure 4:
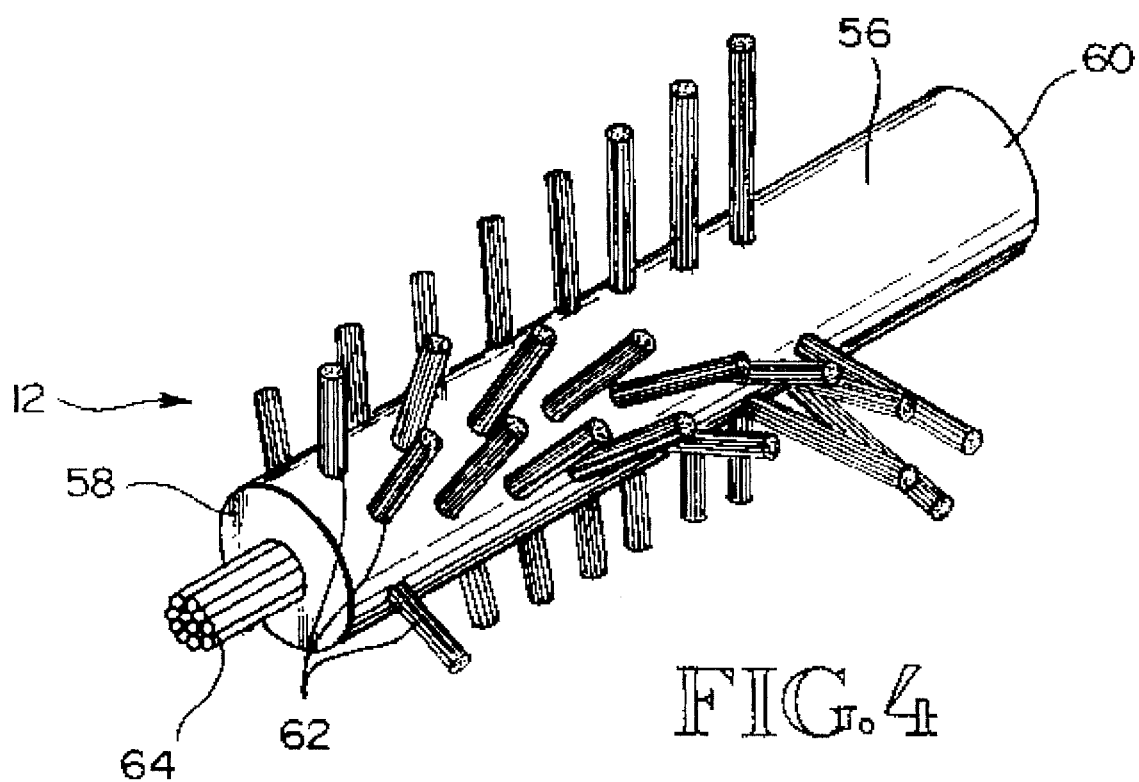
FIG. 4 is an isometric view of a preferred embodiment of an eviscerating brush.

Referring now to FIG. 4, brush 12 is shown. Brush 12 includes a shaft 56 or otherwise known as a bristle holder. While various diameters would work, the preferred embodiment has a one inch diameter shaft made from a non-corrosive material such as plastic or stainless steel. Brush 12 has a free end 58 and a driven end 60. Driven end 60 includes internal threads (see FIG. 2) for connection to motor shaft 32 or all intermediate coupling. This enables brushes of different sizes and stiffnesses to be readily interchangeable. Brush 12 is made up of one or more bristle rows 62, a row having one or more bristles placed generally axially along shaft 56 from free end 58 toward driven end 60. In the preferred embodiment each bristle row 62 is placed spirally around shaft 56 with the first and last bristles in a row being displaced ninety degrees from each other. This configuration helps feed the fish over brush 12 and also helps draw the entrails out of the fish. While different bristle lengths will provide corresponding overall diameters, selected according to the species of fish to be eviscerated, the present invention uses the following:

eight inch shaft length:
quarter inch bristles at the free end and one-half inch length bristles at the driven end; and
six inch shaft length:
one-half inch length bristle at the free end and one inch length bristles at the driven end.

It has been found that fourteen to twenty-four gage monofilament bristles work the best, but other lengths and gages may work better on different species of fish. Almost any type of bristle material will work to eviscerate a fish. Using a bristle stiffer than twenty-four gage may begin to damage the flesh of a fish being processed. The bristles are attached by normal brush manufacturing techniques, in this case using stainless steel staples to ensure that there is no corrosion.

In the preferred embodiment of brush 12 an anal bristle 64 is provided. Anal bristle 64 extends axially outwardly from free end 58 of shaft 56. Anal bristle 64 is made from very stiff bristle material. Anal bristle 54 helps clean out the anus area and cuts-off the entrails from the anal opening of the fish. On brushes having a six inch shaft the preferred anal bristle is one-half inch and on eight inch shafts the preferred anal bristle is three-quarters of an inch in length.

A fish begins processing by having it's head cut off by a band saw or the like. Next the fish is held with it's back toward guide trough 22 with larger fish actually in contact with trough 22 and the opening where the head used to be toward brush 12. As the fish is feed onto the brush it's entrails are wrapped around brush 12 and urged out of the fish as well as being ground up with the fish's body cavity. As the fish is withdrawn from the brush water from nozzle 20 rinses away the entrails. The present invention is so efficient that it actually removes the blood line better than a worker can remove the same. The operation is much easier on the workers physically reducing fatigue and increasing production.

Having described the presently known best mode for carrying out the invention, it is to be understood that the fish entrails removing device, brush, and method described above and shown in the drawings could be altered in some ways without departing from what is considered to be the spirit and scope of the present invention.

I claim:

In the claims:

1. An apparatus for removing entrails from a beheaded fish comprising:

a brush, said brush being sized to fit within said fish's body cavity, said brush having a brush shaft and a plurality of bristles extending generally radially outwardly therefrom, a means for rotating said brush at a selected speed for effectively eviscerating said fish, and means for guiding said beheaded fish over said brush such that said bristles both scrub said fish's cavity and remove its entrails.

2. An apparatus according to claim 1, wherein said means for rotating said brush includes a base plate having a rotary motor attached thereto and a shaft coupled to said brush for imparting a rotational force into said brush.

3. An apparatus according to claim 2, wherein said base plate includes a mounting frame, a hinge attached to said mounting frame and a safety hood attached to said hinge whereby said brush is generally enclosed by said safety hood during operation thereof.

4. The apparatus of claim 2, wherein a water nozzle is attached to said base plate, said nozzle having an outlet directed toward said brush.

5. An apparatus according to claim 2, wherein said means for guiding includes a guide trough extending outwardly therefrom generally under and spaced apart from said brush.

6. An apparatus according to claim 1, wherein said brush includes at least one row of bristles extending radially outwardly from said brush shaft, said row of bristles extending axially along said brush shaft, from a free end of said brush toward a driven end of said brush, a predetermined distance to effectively eviscerate a desired species of fish being processed.

7. An apparatus according to claim 6, wherein a plurality of rows of bristles encircle said brush shaft.

8. An apparatus according to claim 7, wherein said plurality of rows of bristles are generally arranged in a spiral pattern around and along said brush shaft.

9. An apparatus according to claim 6, wherein an anal bristle extends axially out of said free end of said brush shaft whereby when a fish is placed over said brush said anal bristle ensures that the fish's entrails are completely removed from the anal area.

10. A method of removing entrails from a beheaded fish including the steps of:

rotating a generally cylindrically shaped brush sized to fit within said beheaded fish's body cavity, at a selected speed to effectively eviscerate said fish, placing a beheaded fish over said rotating brush, removing said beheaded fish from said brush with said brush having removed entrails from said fish.

11. The method of claim 10 including the step providing a water flow over said rotating brush.

* * * * *